US011263824B2

(12) United States Patent
Forbes et al.

(10) Patent No.: US 11,263,824 B2
(45) Date of Patent: Mar. 1, 2022

(54) METHOD AND SYSTEM TO GENERATE AUTHORING CONDITIONS FOR DIGITAL CONTENT IN A MIXED REALITY ENVIRONMENT

(71) Applicant: Unity IPR Aps, Copenhagen K (DK)

(72) Inventors: Jonathan Manzer Forbes, San Francisco, CA (US); Hugo van Heuven, Brooklyn, NY (US)

(73) Assignee: Unity IPR ApS, Copenhagen (DK)

( * ) Notice: Subject to any disclaimer, the term of this patent is extended or adjusted under 35 U.S.C. 154(b) by 0 days.

(21) Appl. No.: 16/684,425

(22) Filed: Nov. 14, 2019

(65) Prior Publication Data

US 2020/0151965 A1    May 14, 2020

Related U.S. Application Data

(60) Provisional application No. 62/767,330, filed on Nov. 14, 2018.

(51) Int. Cl.
| | |
|---|---|
| *G06T 19/00* | (2011.01) |
| *G06T 19/20* | (2011.01) |
| *G06F 16/28* | (2019.01) |
| *G06T 7/70* | (2017.01) |
| *G06T 17/00* | (2006.01) |

(52) U.S. Cl.
CPC ............ *G06T 19/20* (2013.01); *G06F 16/285* (2019.01); *G06T 7/70* (2017.01); *G06T 17/00* (2013.01); *G06T 19/006* (2013.01); *G06T 2219/2004* (2013.01); *G06T 2219/2016* (2013.01)

(58) Field of Classification Search
CPC .................................................... G06T 19/006
See application file for complete search history.

(56) References Cited

U.S. PATENT DOCUMENTS

| | | | |
|---|---|---|---|
| 9,984,510 B1 * | 5/2018 | Kinstner | ............... G06T 19/006 |
| 2014/0129342 A1 * | 5/2014 | Sanghavi | ........... G06Q 30/0277 |
| | | | 705/14.66 |
| 2017/0287218 A1 * | 10/2017 | Nuernberger | ........... G06T 19/20 |
| 2018/0374276 A1 * | 12/2018 | Powers | .................... G06T 19/20 |
| 2019/0293609 A1 * | 9/2019 | Oh | .......................... G01S 15/86 |
| 2019/0378204 A1 * | 12/2019 | Ayush | ................ G06Q 30/0643 |
| 2020/0226820 A1 * | 7/2020 | Stachniak | ............. G06T 15/205 |
| 2021/0097775 A1 * | 4/2021 | Zurmoehle | ............. G06F 3/017 |

* cited by examiner

*Primary Examiner* — Phi Hoang
(74) *Attorney, Agent, or Firm* — Schwegman Lundberg & Woessner, P.A.

(57) ABSTRACT

Systems and methods for spawning a digital object in an environment are disclosed. Data describing the environment is received. The data includes data describing properties of the environment, a state of the environment, and properties of a plurality of objects within the environment. The data is analyzed to detect and categorize one or more of the plurality of objects, and to detect one or more surfaces related to the plurality of objects. Data is received that describes a placement of the digital object on one of the detected surfaces or detected objects and determines properties of the placement. Conditions are associated with the placed digital object, the conditions including data describing properties of the placement, data describing properties of the detected object, and data describing a state of the detected object. The spawning of the digital object is performed in the environment based on the conditions.

19 Claims, 14 Drawing Sheets

METHOD AND SYSTEM TO GENERATE AUTHORING CONDITIONS FOR DIGITAL CONTENT IN A MIXED REALITY ENVIRONMENT

CROSS-REFERENCE TO RELATED APPLICATIONS

This application claims the benefit of U.S. Provisional Application No. 62/767,330, filed Nov. 14, 2018, which is incorporated by reference herein in its entirety.

TECHNICAL FIELD

The present invention relates to the field of tools for use in creating and manipulating digital content for mixed reality environments.

BACKGROUND OF THE INVENTION

When creating and editing digital content within a mixed reality (MR) environment (e.g., for use in MR games and other MR applications), using traditional authoring techniques is problematic due to the dynamic and unpredictable (e.g., unknown during authoring) nature of real-world objects on which virtual objects are placed at runtime. The digital content must be placed, oriented, scaled, and given properties during authoring (e.g., during creation and editing) so that the content appears as desired by the author during runtime (e.g., during game or simulation runtime). Authoring in mixed reality is not the same as authoring in standard 3D environments wherein a virtual environment is known, controlled and stable. In a mixed reality environment, typically information from the real-world is received at runtime via a camera (either regular or depth) and provides incomplete knowledge of a surrounding environment which cannot be known in advance during an authoring process. During the authoring process, many missing details about the runtime environment make it difficult, and sometimes impossible, to efficiently and directly author digital content prior to runtime (e.g., the existence, orientation, placement, dimensions, scale and other properties of objects in a real-world environment cannot all be known in advance). While real-world surfaces are often detectable (e.g., via image analysis) and some level of semantic understanding of device surroundings is achievable, current MR authoring software often only has one or two detected horizontal/vertical planes on which to place virtual objects. More importantly, these surfaces are often provided without any context of what they represent (e.g., floor vs. tabletop). An author of MR content typically has to place virtual objects in the MR environment manually by visually determining an adequate place. This is not an efficient way of authoring in MR environments.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
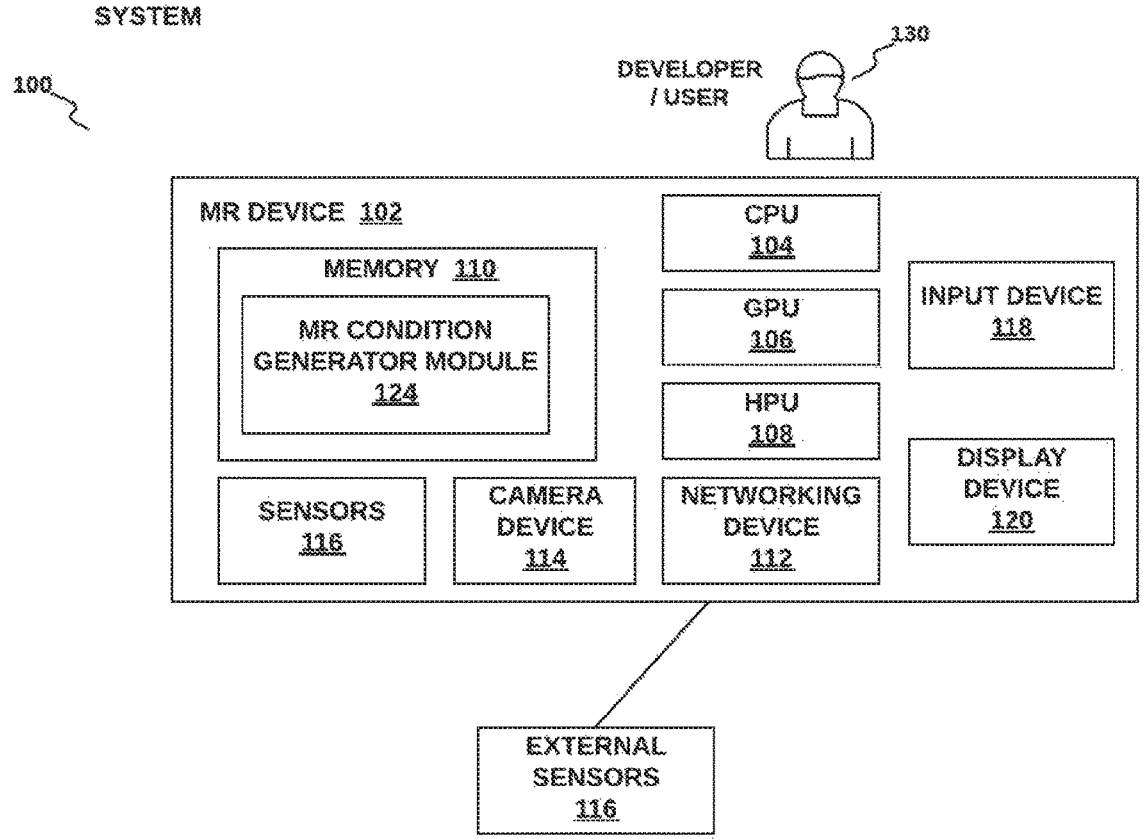
FIG. 1 is a schematic illustrating a mixed reality (MR) Condition Generator system, in accordance with one embodiment.

The description that follows describes systems, methods, techniques, instruction sequences, and computing machine program products that constitute illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The present invention includes apparatuses which perform one or more operations or one or more combinations of operations described herein, including data processing systems which perform these methods and computer readable media which when executed on data processing systems cause the systems to perform these methods, the operations or combinations of operations including non-routine and unconventional operations.

Throughout the description herein, the term 'mixed reality' (MR) should be understood to include all combined environments in the spectrum between reality and virtual reality (VR) including virtual reality, augmented reality (AR) and augmented virtuality.

Throughout the description herein, the term 'authoring' is meant to include the creation and editing of mixed reality experiences and the digital content therein. Authoring may involve a user directly manipulating digital content as it appears in a mixed reality environment via a mobile device (e.g., head mounted display, mobile phone, tablet, and the like) or via a user interface on a computer screen (e.g., desktop or laptop).

The term 'game' used throughout the description herein should be understood to include video games and applications that execute and present video games on a device, and applications that execute and present simulations on a device. The term 'game' should also be understood to include programming code (either source code or executable binary code) which is used to create and execute the game on a device.

The term 'environment' used throughout the description herein should be understood to include 2D digital environments (e.g., 2D video game environments, 2D simulation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'game object', used throughout the description herein is understood to include any digital object or digital element within an environment. A game object can represent (e.g., in a corresponding data structure) almost anything within the environment; including characters, weapons, scene elements (e.g., buildings, trees, cars, treasures, and the like), backgrounds (e.g., terrain, sky, and the like), lights, cameras, effects (e.g., sound and visual), animation, and more. A game object is associated with data that defines properties and behavior for the object.

The terms 'asset', 'game asset', and 'digital asset', used throughout the description herein are understood to include any data that can be used to describe a game object or can be used to describe an aspect of a game or project. For example, an asset can include data for an image, a 3D model (textures, rigging, and the like), a group of 3D models (e.g., an entire scene), an audio sound, a video, animation, a 3D mesh and the like. The data describing an asset may be stored within a file, or may be contained within a collection of files, or may be compressed and stored in one file (e.g., a compressed file), or may be stored within a memory. The data describing an asset can be used to instantiate one or more game objects within a game at runtime.

The term 'runtime' used throughout the description herein should be understood to include a time during which a program (e.g., an application, a video game, a simulation, and the like) is running, or executing (e.g., executing programming code). The term should be understood to include a time during which a video game is being played by a human user or an artificial intelligence agent.

An MR Condition Generator system and associated methods are described herein. The MR Condition Generator is a system and associated methods for automatically and non-programmatically (e.g., without coding) generating conditions for spawning digital objects in a MR environment. The MR Condition Generator system automatically generates the spawning conditions by learning from the actions of a user while in a second (e.g., in some embodiments, known) MR environment. The MR Condition Generator method and system allows for the simple creation of digital content in a MR environment without directly writing software code. The MR Condition Generator method and system includes one or more operations that include learning from simulated or real-world data to generate conditions that can be used at a subsequent time for MR authoring. The learning including analyzing an initial set of actions (e.g., from a human user) performed on a digital object within a first MR environment to determine conditions for the digital object, which can later be used to automatically spawn and place one or more copies of the digital object in a different MR environment according to details within the conditions. Using the MR Condition Generator system and method, an author with an MR device (e.g., a desktop computer, augmented reality device, virtual reality headset, and the like) can generate conditions while authoring MR content in a first MR environment and know how the MR content will appear and behave in a second MR environment (e.g., real-world augmented reality environment) due to the use of the generated conditions in the second environment (e.g., at runtime).

In accordance with an embodiment, the MR Condition Generator system is configured to display and manipulate digital content within an MR environment via a MR-capable device. In an example embodiment, a user (e.g., a wearer of an HMD, or someone holding a smartphone, tablet, or other MR-capable device) experiences the MR environment as presented by the MR Condition Generator system via an MR device. In some embodiments, the MR environment as seen by a user includes a view of the real-world (e.g., including immediate surroundings of the MR-capable device) along with virtual content provided by the MR Condition Generator system. In accordance with some embodiments, the MR device includes a camera configured to capture digital video or images of the real-world around the device (e.g., when held by a user), optionally including depth data, which the MR Condition Generator system may analyze to provide some of the MR Condition Generator features described herein.

In some embodiments, the MR Condition Generator system and the various associated hardware and software components described herein may provide virtual reality (VR) content instead of, or in addition to, augmented reality (AR) content. It should be understood that the systems and methods described herein may be performed with AR content and VR content and, as such, the scope of this disclosure covers both AR and VR applications.

In example embodiments, systems and methods for spawning a digital object in an environment are disclosed. Data describing the environment is received. The data includes data describing properties of the environment, a state of the environment, and properties of a plurality of objects within the environment. The data is analyzed to detect and categorize one or more of the plurality of objects, and to detect one or more surfaces related to the plurality of objects. Data is received that describes a placement of the digital object on one of the detected surfaces or detected objects and determines properties of the placement. The properties including at least a position, orientation and scale of the placed digital object with respect to a local coordinate system associated with the detected object. Conditions are associated with the placed digital object, the conditions including properties of the placement, data describing properties of the detected object, and data describing a state of the detected object. The spawning of the digital object is performed in the environment based on the conditions.

Turning now to the drawings, systems and methods, including non-routine or unconventional components or operations, or combinations of such components or operations, for automatically and non-programmatically (e.g., without coding) generating conditions for spawning digital objects in a MR environment are illustrated. In accordance with an embodiment, FIG. 1 is a diagram of an example MR Condition Generator system 100 and associated devices configured to provide MR Condition Generator functionality to a user 130 (e.g., a software developer). In an example embodiment, the MR Condition Generator system 100 includes a MR device 102 operated by the user 130. The MR device 102 is a computing device capable of providing a mixed reality experience or a mixed reality environment to the user 130. In some embodiments, the MR device 102 is a head-mounted display (HMD) device worn by the user 130, such as an augmented reality (AR) or virtual reality (VR) visor (e.g., Google Glass®, HTC Vive®, Microsoft HoloLens®, and so forth). In other embodiments, the MR device 102 is a mobile computing device, such as a smartphone or a tablet computer. In other embodiments, the MR device is a desktop or laptop computer.

In accordance with an embodiment, the MR device 102 includes one or more central processing units (CPUs) 104, graphics processing units (GPUs) 106, and specialized processing unit 108 (e.g., holographic processing unit—HPUs). The processing device 104 is any type of processor, processor assembly comprising multiple processing elements (not shown), having access to a memory 110 to retrieve instructions stored thereon, and execute such instructions. Upon execution of such instructions, the instructions cause the processing device 104 to perform a series of tasks as described herein (e.g., in reference to FIG. 2, FIG. 3, FIG. 4A, FIG. 4B, FIG. 4C, FIG. 5A, FIG. 5B, FIG. 6A, FIG. 6B, FIG. 6C, and FIG. 6D). The MR device 102 can also include one or more networking devices 112 (e.g., wired or wireless network adapters) for communicating over a network including a cellular network, a Wi-Fi network, the Internet, and so forth. The MR device 102 further includes one or more camera devices 114 which may be configured to capture digital video of the real-world near the MR device 102 during operation. The MR device 102 may also include one or more sensors 116, such as a global positioning system (GPS) receiver (e.g., for determining a GPS location of the MR device 102), biometric sensors (e.g., for capturing biometric data of the user 130), motion or position sensors (e.g., for capturing position data of the device 102, the user 130 and other objects), a depth sensor (e.g., LIDAR), and an audio microphone (e.g., for capturing sound data). Some sensors 116 may be external to the MR device 102, and may be configured to wirelessly communicate with the MR device 102 (e.g., such as used in the Microsoft Kinect®, Vive Tracker™, MIT's Lidar sensor, or MIT's wireless emotion detector).

The MR device 102 may also include one or more input devices 118 such as, for example, a keyboard or keypad, mouse, pointing device, touchscreen, a microphone, a camera, a hand-held device or the like (e.g., hand motion tracking device) for inputting information in the form of a data signal readable by the processing device 104. The MR device 102 further includes one or more display devices 120, such as a touchscreen of a tablet or smartphone, or lenses or visor of a VR or AR HMD, which may be configured to display virtual objects to the user 130 in conjunction with a real-world view.

The MR device 102 also includes a memory 110 configured to store a MR Condition Generator module 124. The memory 110 can be any type of memory device, such as random access memory, read only or rewritable memory, internal processor caches, and the like. The MR Condition Generator module 124, executing on the MR device 102 (e.g., an HMD), may be configured to capture data from the camera device 114 or sensors 116 to perform various functions of the MR Condition Generator system 100. The camera device 114 and sensors 116 capture data from the surrounding environment, such as video, audio, depth information, GPS location, and so forth. The MR Condition Generator module 124 may be configured to analyze the captured data directly, and analyze processed captured data (e.g., real-time data regarding detected and identified objects, including object shape data, depth maps, semantic information, and the like).

In accordance with an embodiment, the term 'spawning conditions' or simply 'conditions' used herein includes data that describes one or more properties of a first object, or states of a first object, which must be satisfied in order for a second object to be placed on or near the first object in a mixed reality environment. In example embodiments, how near an object may be placed to another object is based on a configurable parameter (e.g., as set by an administrator or through the machine-learning operations described herein). The second object may be spawned (e.g., created) prior to being placed. A set of conditions is associated with the second object, and optionally is associated with the first object. The properties can include intrinsic properties of the first object as well as extrinsic properties of the first object with respect to the MR environment and its interaction therewith. The data can also include a description of the state of the first object, and a state of the environment in proximity to the first object. The first object includes real-world objects, virtual representations of a real-world object, and virtual objects. A condition can include a plurality of spawning criteria, wherein the spawning criteria includes one or more of the following: location criteria (e.g., including location of the first object with respect to other objects in the MR environment, elevation of the first object above another object, geolocation of the first object (e.g., with GPS data), and the like), proximity criteria (e.g., including distance criteria between the first object and one or more additional objects in the MR environment), orientation criteria (e.g., an angle criteria between the first object and other objects or surfaces), alignment criteria (e.g., including horizontal and vertical alignment of a part of the first object with one or more objects (or parts of the objects) in the MR environment, alignment between the first object and other objects), object dimension criteria (e.g., including criteria regarding the first object size), lighting criteria (e.g., criteria regarding an amount and a type of light hitting the first object), color criteria (e.g., a criteria regarding an apparent color of the first object), texture criteria (e.g., a criteria regarding a texture of the first object) and any other property of the first object and surrounding MR environment. A set of conditions associated with a digital object specify where and how the digital object can be spawned (e.g., placed) within an MR environment. In accordance with an embodiment, the MR Condition Generator system 100 can determine an optimal scene layout in any MR environment, for any combination of digital objects and associated conditions (e.g., placing a plurality of versions of the second object if a plurality of first objects in the MR environment satisfy a set of conditions associated with the second object). For example, a set of conditions can include criteria for a real-world object (e.g., the first object) in an MR environment to be within a certain size range, oriented a specific way, and with a specific amount of incident light (e.g., as specified within the criteria). Continuing with the example, the MR Condition Generator system 100 may scan the MR environment with sensors, and upon satisfaction of the criteria by a real-world object within the MR environment, place a second digital object (e.g., representing a virtual plane) in the MR environment on top of the real-world object which satisfied the criteria. As another example, a set of conditions can include criteria such that a digital object representing a virtual couch is placed in a MR environment on top of a detected real-world couch (or virtual couch) that is within a certain size range, oriented a specific way, and with a certain amount of incident light as specified in the criteria.

In accordance with an embodiment, conditions include non-spatial criteria that include one or more of the following: lighting (e.g., specifying an amount of incident light hitting an object), and color (e.g., an acceptable color range of an object), and texture (e.g., roughness, reflectivity, transparency, surface flexibility, and the like), and type of object (e.g., chair, table, ball, wall, etc.) and other user-defined criteria. The spatial and non-spatial conditions can include visual boundaries which may be displayed on a display device and used during an authoring process.

In accordance with an embodiment, the term Digital Island used herein represents a digital object that occupies a volume of space in which a coordinate system is stable and which can include digital objects and which can be placed and manipulated within an MR environment (e.g., as the second object of a condition). A Digital Island can be used to represent a real-world object (or a part of a real-world object) in the real-world (e.g., a flat surface of a table top, a couch, a chair, a light, a bench, and the like). A Digital Island can also represent a virtual object. A Digital Island can take on different shapes depending on the object it is representing. For example, the Digital Island could be a virtual plane when representing a real-world flat surface such as the top of a table. For objects with more complicated surface and volume geometry (e.g., a couch, a chair, a light, etc.) the Digital Island could instead be represented by a 3D model for the object. In accordance with an embodiment, a Digital Island includes one or more conditions which allows it to be automatically placed within a MR environment.

In accordance with an embodiment, a Digital Island provides a local coordinate system for digital authoring (e.g., by a user). The digital authoring involves adding digital objects to the Digital Island wherein the digital objects become part of the Digital Island (e.g., have a parent-child relationship wherein the child shares some properties with the Digital Island parent). The local coordinate system is mapped at runtime to real-world data (e.g., from real-world objects) that matches the conditions for the Digital Island. For example if a virtual horse with a specified size and orientation is placed on a plane Digital Island representing a table top, and if a real-world table top is detected in an MR environment that satisfies the conditions for the plane Digital Island, then the plane Digital Island with the virtual horse is placed in the MR environment on the real-world table top in a way that further satisfies the conditions.

Figure 2:
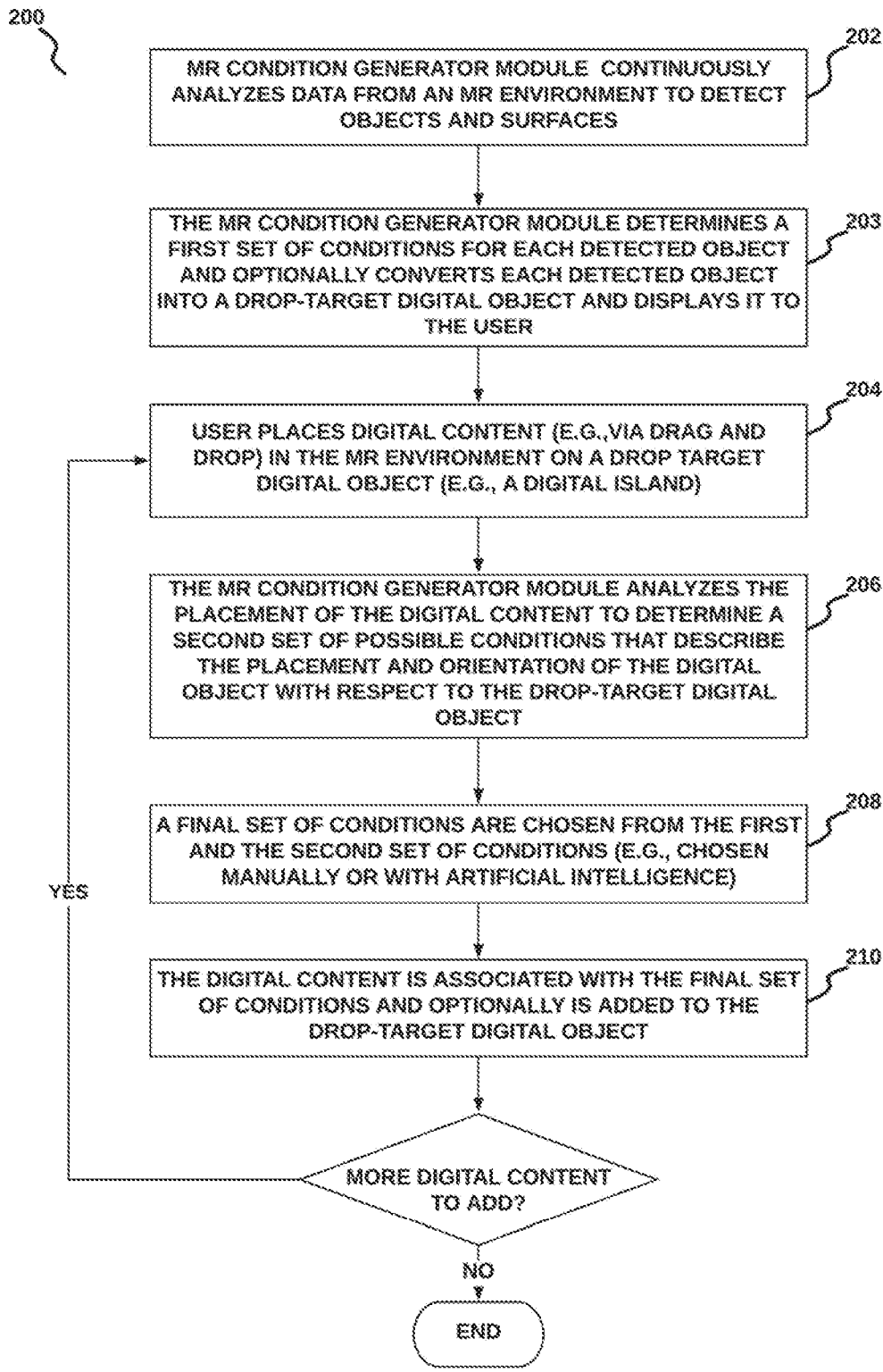
FIG. 2 is a flowchart of a method for generating conditions in an MR environment, in accordance with one embodiment.

In accordance with an embodiment and shown in FIG. 2 is a flow chart for a MR condition generation method 200 for generating conditions and associating the generated conditions with a digital object (e.g., a Digital Island). The conditions are generated by analyzing the placement or digital content in an MR environment (e.g., as placed by the actions of a user on a MR device 102). In accordance with an embodiment, the MR environment of the method 200 is part of a development environment wherein MR games, MR simulations and MR applications are created (e.g., within a software application). The MR environment is presented to the user via a MR device 102 (e.g., using the camera, sensors and display of the MR device). For example, the MR device 102 may be a desktop computer which presents the MR environment as a purely virtual 3D digital environment via a computer monitor; and alternatively, the MR device 102 may be a mixed reality headset worn by the user and moved through a real-world environment which is displayed to the user as a MR environment via a headset display 120.

In accordance with an embodiment, at a first time (e.g., during authoring time) a set of conditions are associated (e.g., by the MR Condition Generator module 124) with an object (e.g., a table) in order to describe the object so that a similar object can be found at a different time (e.g., during runtime or gametime) and possibly in a different MR environment. In accordance with an embodiment, the criteria within the set of conditions are provided as a range of values so that the similar object is an object that fits within the range of values of the conditions. For example, during authoring, a user can use a drag-and-drop methodology to place a digital object 'A' onto a first table in a first MR environment, and that action will cause the MR condition generator module 124 to automatically create (e.g., using the method 200) a set of conditions that can be used at a later time (e.g., by an application during runtime) to find a similar table in a second MR environment and place a similar object 'A' (e.g., an instance of an object) on the similar table. For example, the MR condition generator module 124 could analyze the first table to generate the following conditions, including: criteria for a surface that has a horizontal orientation (e.g., within a range of degrees from horizontal), and that has a specific range of dimensions (e.g., X by Y meters+/−Z meters), and that has a range of elevation values relative to a floor (e.g., H+/−Z meters).

In accordance with an embodiment, at operation 202 of the method 200, the MR condition generator module 124 continuously analyzes data from the MR environment (including a real-world environment and a virtual environment) to detect items including surfaces and objects (e.g., analyzing data from the MR device sensors 116 and camera 114 as the MR device 102 moves through the MR environment). The analysis includes extracting information regarding the detected surfaces and objects, the information including data describing dimensions, orientation, relative posit ions, properties of the surfaces and objects, as well as properties of the environment surrounding the surfaces and objects (e.g., amount of light hitting a surface). The analysis can be performed using image analysis methods on data from the camera 114, and analysis or the sensor data including machine learning methods, signal analysis methods and the like. In accordance with an embodiment, the information regarding the detected surfaces and objects can be associated with the surfaces and objects as semantic information. At operation 203 of the method 200, the MR condition generator module 124 uses the analysis of the data to determine a first set of conditions for each detected item (e.g., each surface and each object) and creates a digital object to represent the detected item and conditions (e.g., converting the detected item and conditions into a Digital Island) and displays in the MR device display 120 the digital object (e.g., the Digital Island) superimposed on the detected item. The displayed digital object which represents the detected item is referred to herein as a drop-target digital object or drop target object since additional digital objects may be placed thereon (e.g., as described within operation 204). The drop-target digital object may be a Digital Island. The first set of conditions includes data extracted from the analysis that includes the dimensions, orientation, relative position and location of the detected item with respect to other objects within the MR environment, properties of the items, as well as properties of the environment surrounding the items (e.g., amount of light hitting a surface). The MR condition generator module 124 may also display the conditions on or near the detected item or the drop-target digital object (e.g., via a user interface element). For example, if the MR condition generator module 124 detects a tabletop in the MR environment, the module 124 determines conditions for the tabletop (e.g., range of values representing the height above the floor, range of values representing a table length, range of values representing a table width, and the like) and creates and displays a drop-target digital object to represent the tabletop (e.g., a planar Digital Island) superimposed on top of the tabletop. In the example, the user might be wearing a virtual reality headset and have the drop-target digital object representing the tabletop displayed according to the conditions allowing the user to experience the conditions in a visual way (e.g., as described with respect to FIG. 4B, FIG. 6B, FIG. 6C and FIG. 6D). At operation 204 of the method 200, the user places digital content (e.g., a digital object) in the MR environment on a detected object or surface (e.g., on the drop-target digital object or Digital Island). In accordance with an embodiment, the placing may be done via a drag and drop process. The placing of digital content including adding, removing, positioning, orienting and adjusting virtual objects on or within the drop-target digital object. At operation 206 of the method 200, the MR condition generator module 124 analyzes the placing of the digital content to determine a second set of conditions that describe the placement and orientation of the digital object with respect to the drop-target digital object. For example, the second set of conditions can include information on the placement and orientation of the digital object with respect to the surface and volume of the drop-target digital object (e.g., the digital object may be placed at the center of a detected surface, or at the edge of a detected surface, or 90% of the distance from the center to the edge of the detected surface, and the like). At operation 208 of the method 200, a final set of conditions is selected from the first and the second set of conditions. The selection can be performed manually (e.g., chosen by the user via a user interface) or performed automatically with artificial intelligence (e.g., chosen by a trained machine learning module). In accordance with an embodiment, at operation 210 of the method 200, the final set of selected conditions are associated with the placed digital content (e.g., added to the digital content as metadata) and optionally are added to the drop-target digital object. In accordance with an embodiment, based on a need to add more digital content, the MR condition generator module 124 loops back to operation 204.

Figure 3:
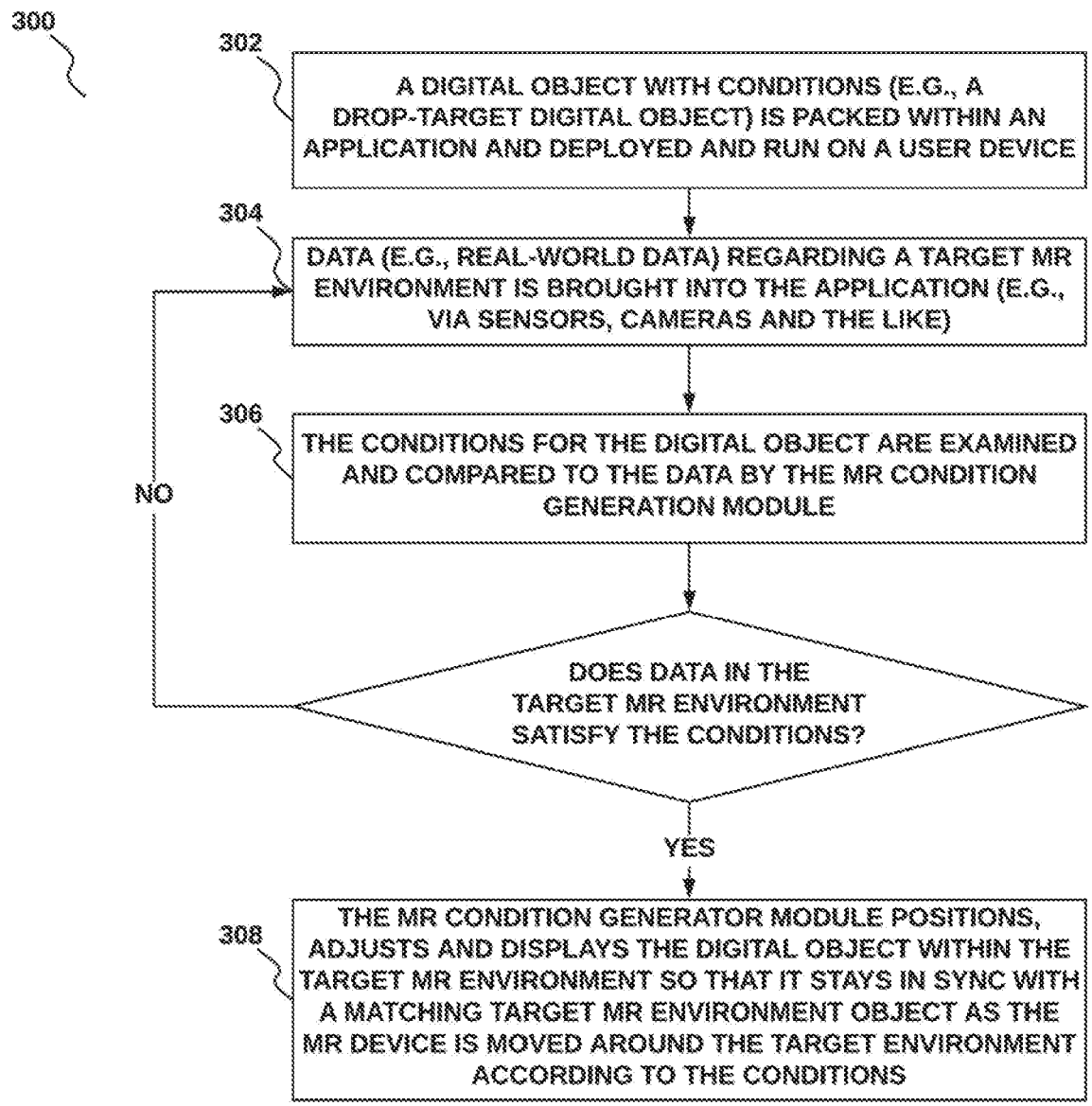
FIG. 3 is a flowchart of a method for placing digital content within a target MR environment using conditions, in accordance with an embodiment.

In accordance with an embodiment, and shown in FIG. 3, is a digital content placement method 300 for placing digital content within a target MR environment using conditions (and optionally using Digital Islands) generated with the MR condition generation method 200 described with respect with FIG. 2. At operation 302 of the method 300, a digital object (e.g., a drop-target digital object) including associated conditions and digital content is packaged within an application (e.g., software application), deployed and run (e.g., executed) on a MR device 102. The MR device 102 may be in motion in the target MR environment (e.g., being moved throughout the target MR environment as part of a game played by a user). At operation 304 of the method 300, data regarding the target MR environment (e.g., data describing aspects of a real-world environment) is captured and brought into the application using internal and external sensors 116, a camera device 114, and other input devices 118 on the MR device 102. In accordance with an embodiment, the target MR environment data may be captured and brought into the application in real-time. In accordance with an embodiment, the target MR environment data can be brought into the application (e.g., imported from a server via a network) from a pre-existing real-world environment scan and from a pre-existing virtual environment (e.g., a virtual environment created with 3D digital content creation software). The target MR environment data can include data describing surfaces and objects within the environment, semantically labeled data of objects within the environment, data describing lighting conditions within the environment, and the like. In accordance with an embodiment, the target MR environment data can come from different sources simultaneously (e.g., from a scan of the real-world in real-time and simultaneously from a pre-existing real-world scan). In operation 306 of the method 300, the conditions for the digital object are examined and compared to the data from the target MR environment scan (e.g., real-world data from the target MR environment). At operation 308 of the method 300, based on a subset of the real-world data associated with an object (e.g., including a part of an object such as a surface) satisfying the conditions based on the comparison, the digital object (e.g., or a duplicate digital object such as an instance of the digital object) is positioned, adjusted, and displayed within the target MR environment so that the displayed digital object stays in sync with (e.g., on top of, or superimposed on) the object (e.g., real-world object) that matches the conditions within the target MR environment. For example, if a tabletop in the target MR environment matches the conditions for the digital object (e.g., based on the digital object created for a tabletop in the method 200), then the digital object (e.g., drop-target digital object) is displayed on top of (e.g., superimposed on) the tabletop in the target MR environment (e.g., displayed in the display 120 of the MR device 102 so as to appear superimposed on the tabletop). As part of operation 308 of the method 300, the digital content (e.g., placed during operation 204 of the method 200 on the drop target digital object or Digital island) is moved and adjusted along with the digital object according to the movement of the MR device 102 (e.g., as the MR device 102 is moved through the target MR environment) in order to maintain the relative size, orientation, positioning and more of the digital content with respect to the digital object as determined from the second set of conditions determined in operation 206. Since the conditions for the digital object match data for the object in the target MR environment, the displayed digital object and associated digital content (e.g., as associated with the digital object in operation 204 of the method 200) in the target MR environment is displayed as defined in operation 204 and operation 206 of the method 200.

Figure 4A:
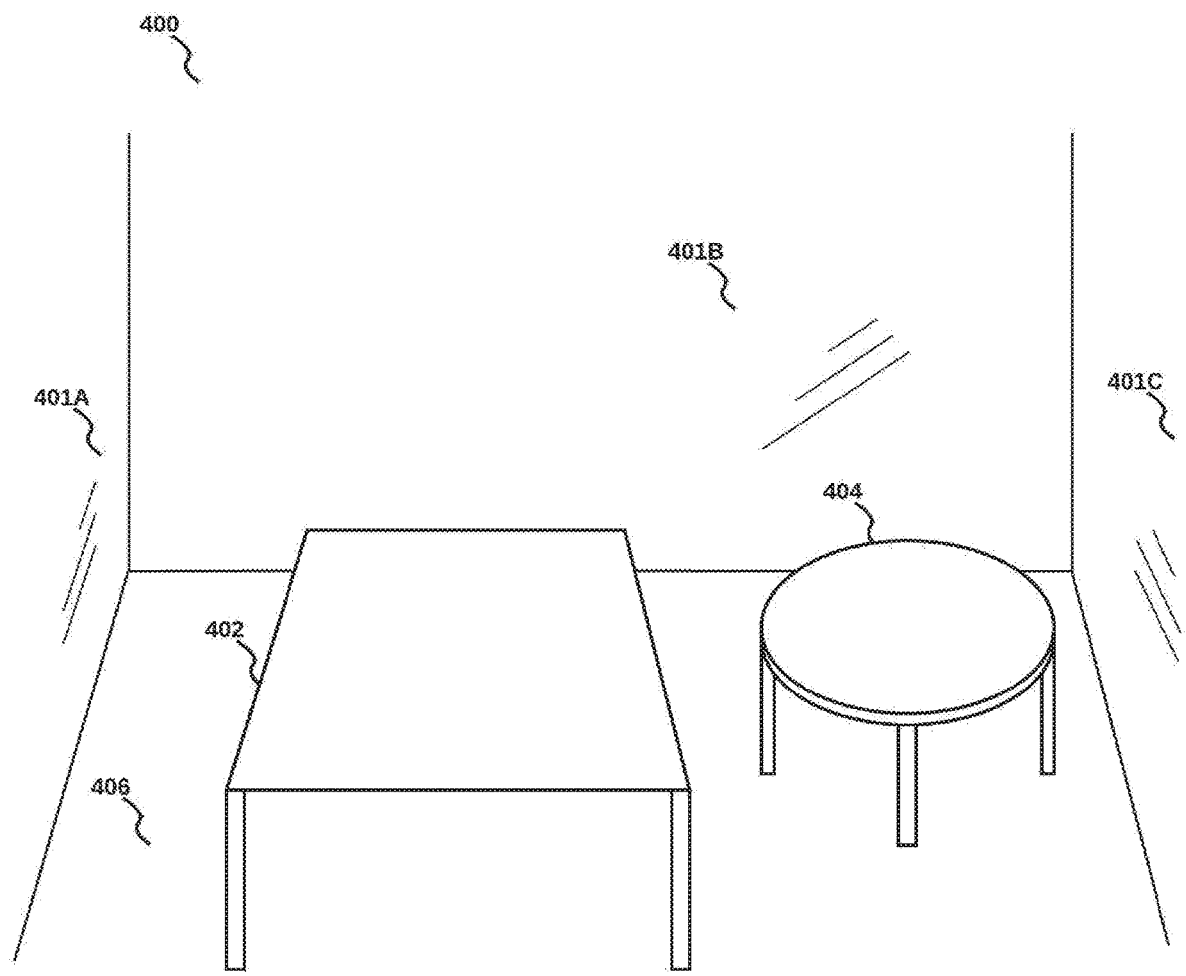
FIG. 4A is a schematic illustrating a view in a MR environment as seen from an MR device, in accordance with one embodiment.

In accordance with an embodiment, and shown in FIG. 4A, is a view into a first MR environment 400 that includes a floor 406, a first wall 401A, a second wall 401B, a third wall 401C, a rectangular table 402 and a circular table 404. The view can be from within a virtual reality headset and wherein the MR environment 400 is a virtual environment. The view can be from within an augmented reality headset and wherein the MR environment 400 is a view of a real-world environment. The view can be from within a user interface on a computer screen (e.g., desktop computer or laptop computer), wherein the MR environment 400 is a virtual environment or real-world environment as seen through a camera. The displayed view could be seen by a user as part of the condition generation method 200.

Figure 4B:
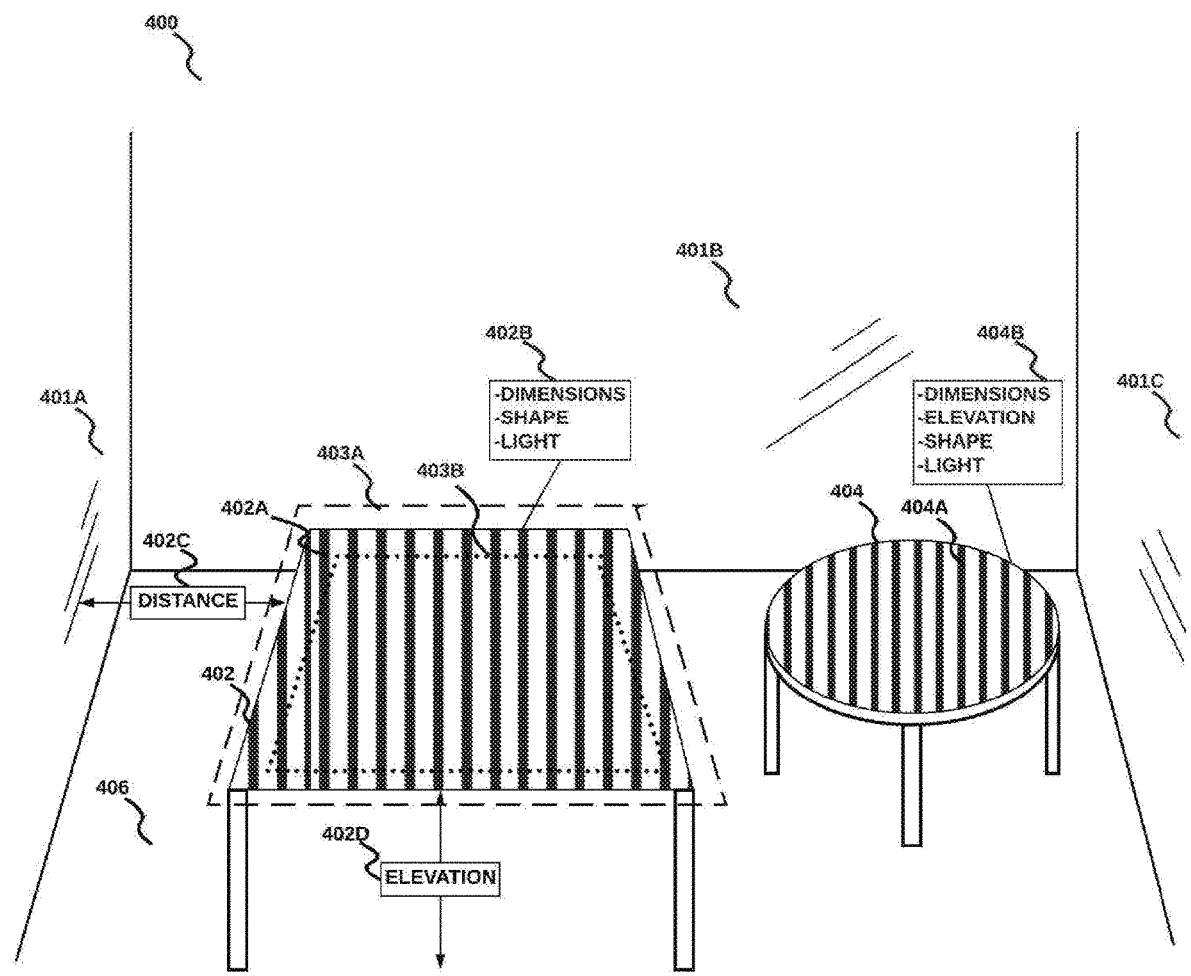
FIG. 4B is a schematic illustrating a mixed reality environment that includes conditions for two tables as seen from an MR device, in accordance with one embodiment.

In accordance with an embodiment and shown in FIG. 4B is the first MR environment 400 (e.g., shown in FIG. 4A) as seen through a MR device 102, showing two detected objects and associated conditions as part of process 203 of the method 200. The two detected objects including the rectangular table 402 and the circular table 404 described with respect to FIG. 4A. The two detected objects are each represented in FIG. 4B by a superimposed drop-target digital object. More specifically, in the example shown in FIG. 4B, a surface of the detected rectangular table 402 is shown as a lined plane drop-target digital object 402A superimposed on the table 402 and matching the location, orientation and size of the table 402 according to conditions for the drop-target digital object 402A. In accordance with an embodiment, the conditions for the drop-target digital object plane 402A are displayed as virtual objects (e.g., a virtual text box) in the MR environment 400 (e.g., displayed via a display device 120 on the MR device 102). In accordance with an embodiment, a first virtual text box object 402B displays conditions that include value ranges for dimensions, shape and incident light. A second virtual text object 402C displays conditions for distance between the table 402 and a wall 401A and optionally displays an arrow between the wall 401A and the table 402. A third virtual text box object. 4021D displays conditions for elevation of the plane 402A above the floor 406 and optionally displays an arrow between the plane 402A and the floor 406. In the example in FIG. 4B, the conditions for the drop-target digital object 402A might include ranges of values for each criterion within the conditions which might be displayed in a visual manner. For example, FIG. 4B shows a displayed maximum boundary 403A, a displayed minimum boundary 403B and a displayed geometric average boundary for the plane 402A (e.g., the visible border corresponding with the edge of the table 402 shown by the plane 402A). Similarly, for the detected circular table 404 in the example shown in FIG. 4B, a surface of the detected circular table 404 is shown as a lined digital plane drop-target digital object 404A superimposed on the table 404 and matching the location, orientation and size of the table 404 according to conditions for the drop-target digital object 404A. In accordance with an embodiment, the conditions for the plane 404A are displayed as a virtual text box object 404B in the MR environment 400 (e.g., via a display device 120 on the MR device 102). The conditions including value ranges for dimensions, elevation, shape and incident light.

Figure 4C:
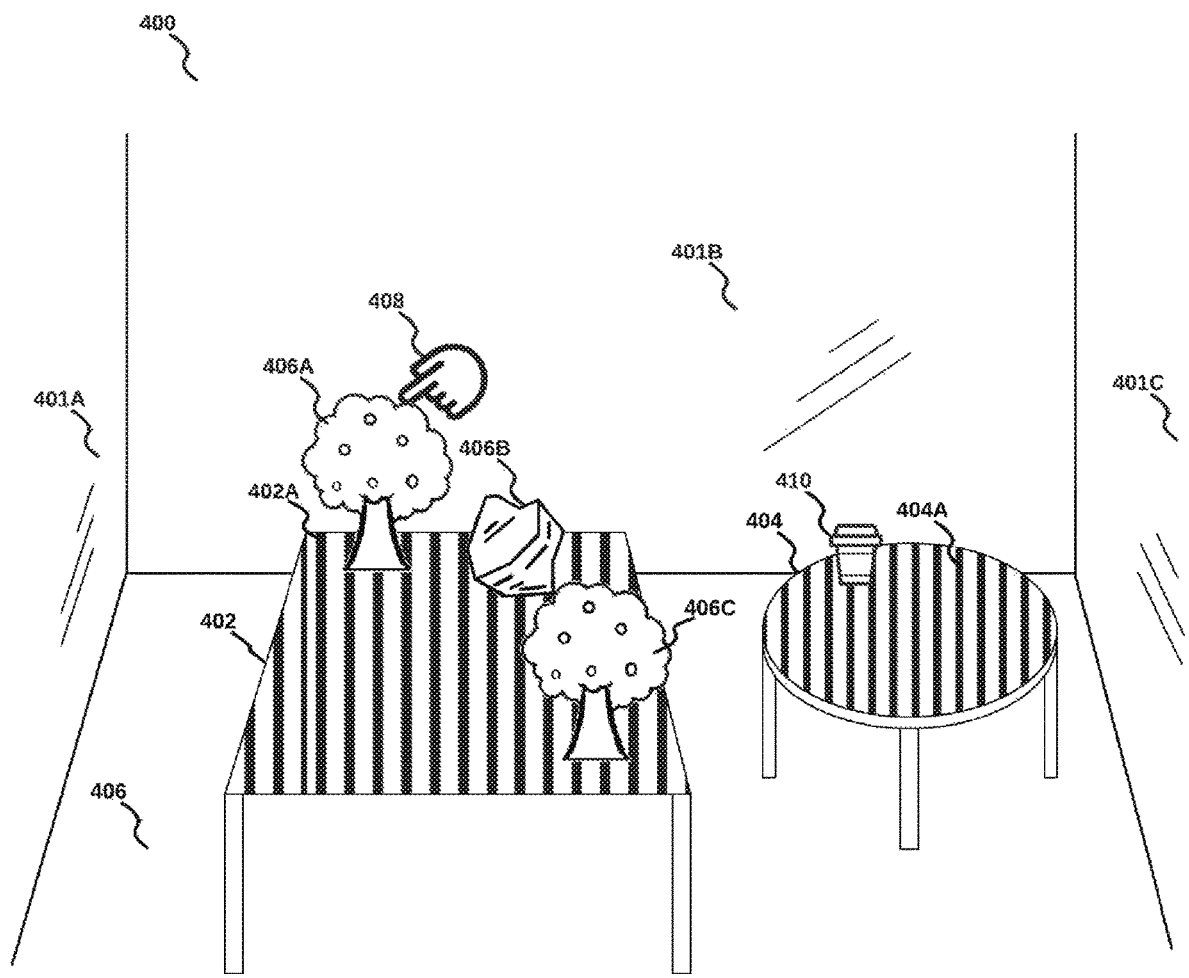
FIG. 4C is a schematic illustrating a mixed reality environment that includes virtual objects on two tables, in accordance with an embodiment.

In accordance with an embodiment, and shown in FIG. 4C, is the first MR environment 400 as seen through a MR device 102 during operation 204 of the method 200. FIG. 4C shows digital objects on the rectangular table 402 and the circular table 404 as placed by a user with a virtual hand 408 as part of operation 204 of the method 200. The virtual hand 408 may represent a real hand of a user that is tracked by hand tracking technology (e.g., including a hand tracking device and hand tracking software) In the example shown in FIG. 4C, a first digital tree 406A, a digital rock 4068 and a second digital tree 406C have been placed by the virtual hand 408 on the drop-target digital object (402A) of the rectangular table 402. In accordance with an embodiment, as part of operation 206, the MR condition generator module 124 associates the conditions of the table 402 (e.g., as displayed in FIG. 4B in text box objects 402B, 402C and 402D) with each of the three digital objects (406A, 406B and 406C) as each object is placed on the drop-target digital object 402A for the table 402. In accordance with an embodiment, as part of operation 210 of the method 200, the user can choose to modify the associated conditions. Based on the drop-target digital object plane 402A being sized as per the conditions of the table 402, a user can see exactly how the digital objects (406A, 406B, and 406C) will be seen in a target mixed reality environment at a later time (e.g., as part of operation 308 of the method 300, or during game time). Continuing with the example shown in FIG. 4C, based on a digital coffee cup 410 being placed on the drop-target digital object 404A of the circular table 404, the MR condition generator module 124 associates conditions for the table 404 and the drop-target digital object 404A with the digital coffee cup 410 as the cup 410 is placed on the table 404.

Figure 5A:
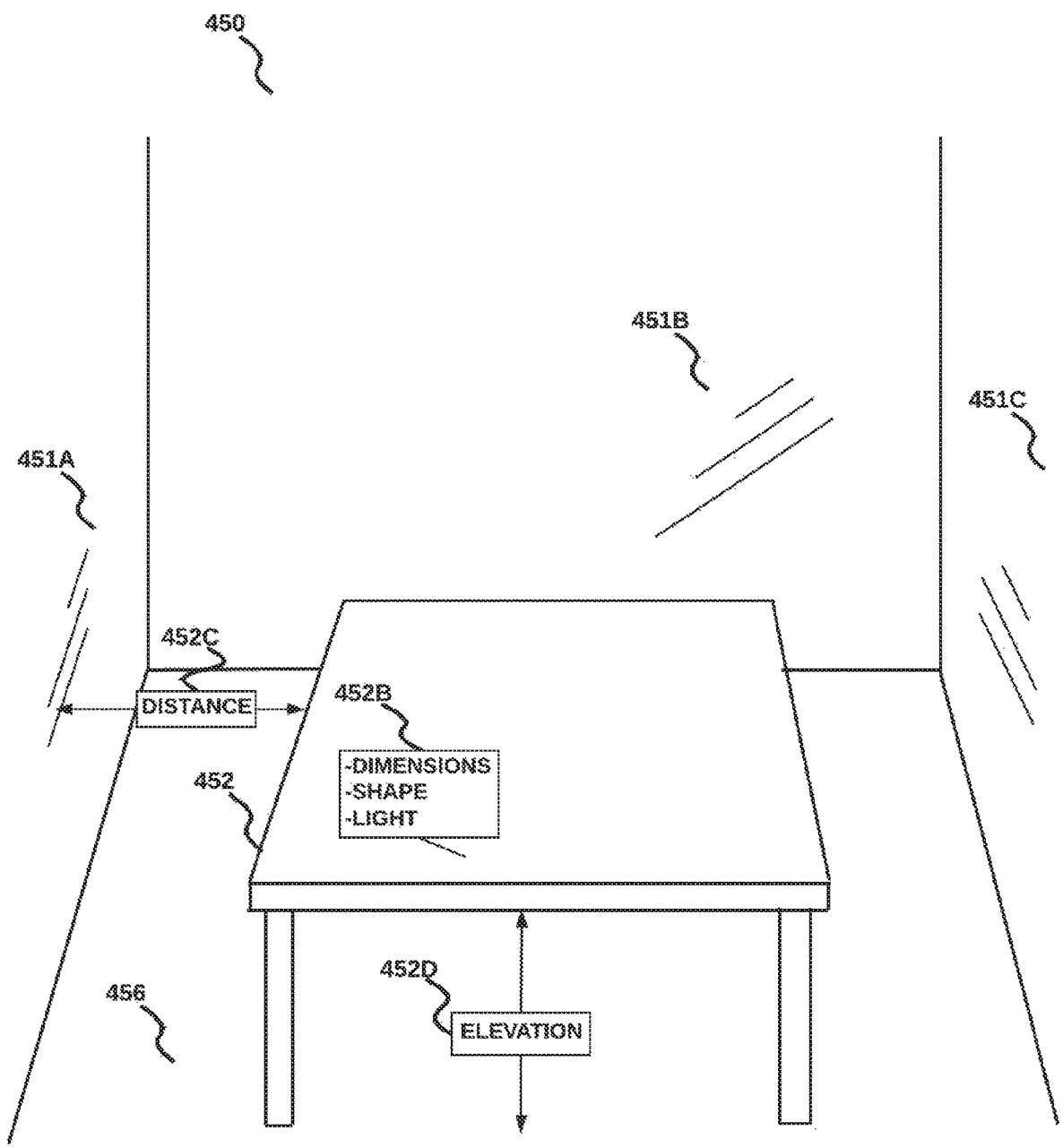
FIG. 5A is a schematic illustrating a view of a mixed reality environment that includes a table, in accordance with an embodiment.

In accordance with an embodiment and shown in FIG. 5A is a view of a target mixed reality environment 450 as seen by a user within a MR device 102 display 120 (e.g., via a MR headset) as part of process 304 of the method 300 (e.g., as part of playing a game or as part of creating a game). In accordance with an embodiment, the view is created using data captured by sensor 116 on the MR device 102. The target MR environment 450 includes a real physical table 452. As part of process 306 from method 300, the MR condition generation module 124 analyzes the data from the MR device sensors 116 and detects the table 452 and associated properties of the table. For example, the MR condition generation module 124 may detect properties for the table 452 that include: a value for the elevation of the top of the table 452 from a floor 456, and a distance from a wall 451A to the table 452, and dimensions of the table 452, and a shape of the table 452, and an amount of light hitting the table 452. In accordance with an embodiment and shown in FIG. 5A, the properties of the table 452 can be displayed as digital text box objects in the MR device display 120. For example, a first digital text box object 452C may display the distance, a second digital text box object 452D may display the elevation, and a third digital text box object 452B may display the dimensions, shape and light information.

As part of operation 306 from method 300, the MR condition generator module 124 matches the properties of the table 452 (e.g., received via the sensors 116 and camera 114 as part of operation 304) to conditions associated with the first digital tree 406A, the digital rock 406B, the second digital tree 406C and drop-target digital object 402A from the example shown in FIG. 4C. For example, based on a shape of the detected real table 452 being rectangular, and detected dimensions of the real table 452 being within the maximum size 403A and minimum size 403B of table dimension range described within the conditions as described with respect to FIG. 4B, and an elevation of the real table 452 being within the range of elevation values as described with respect to FIG. 4B and shown in 402D, and a distance of the table 452 from the wall 451A being within the range of distance values as described with respect to FIG. 4B and shown in 402C, then the table 452 is determined as satisfying the conditions for the first digital tree 406A, the digital rock 4068, the second digital tree 406C and the drop-target digital object 402A. The operation 306 determines that the table 452 in the target environment is similar to (e.g., satisfies the conditions for) for the drop-target digital object 402A of the table 402 in the first MR environment 400.

Figure 5B:
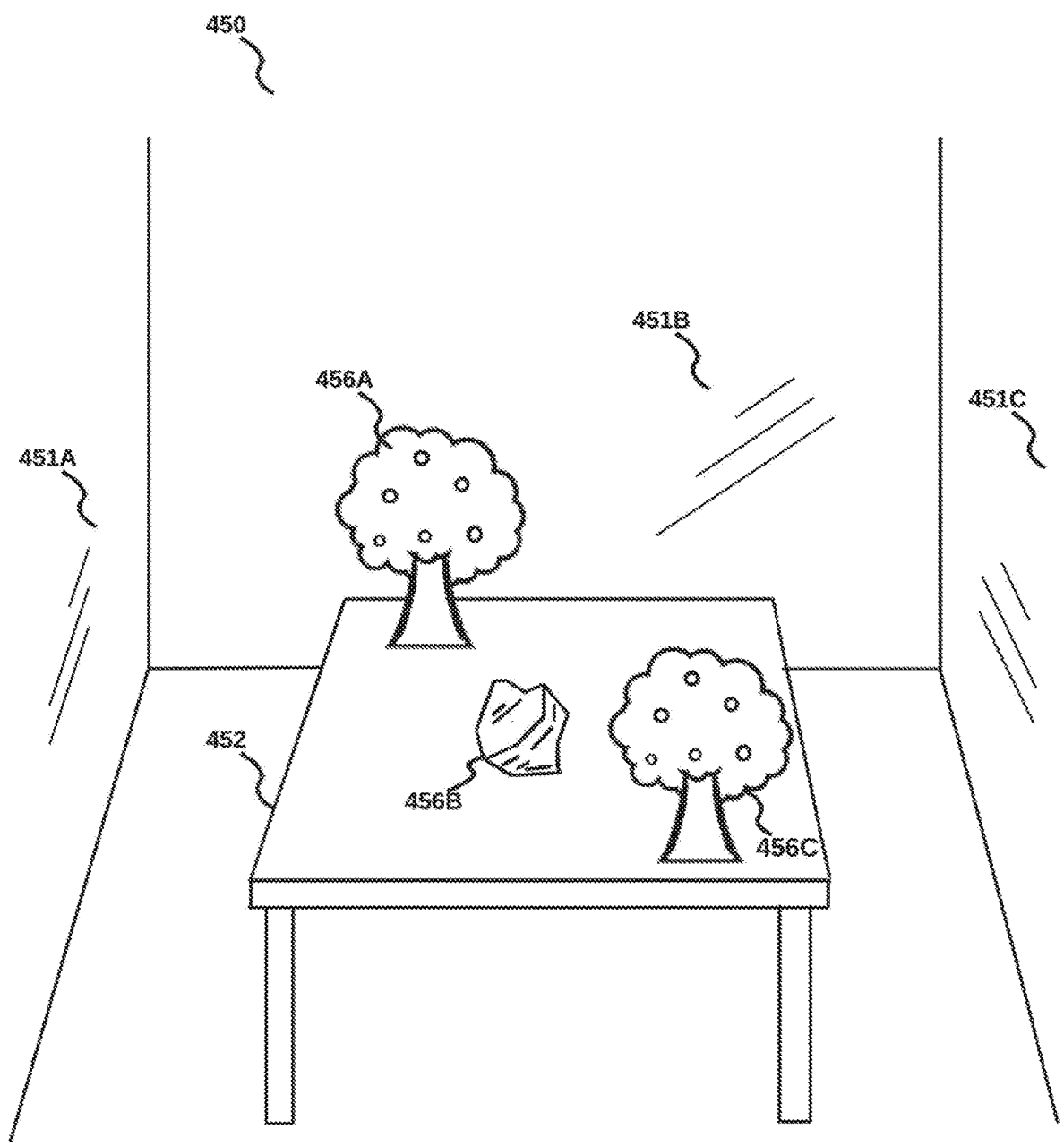
FIG. 5B is a schematic illustrating a view of a mixed reality environment that includes a table with superimposed digital objects, in accordance with an embodiment.

In accordance with an embodiment and shown in FIG. 5B is a view of the target mixed reality environment 450 of FIG. 5A. In accordance with an embodiment and as shown in FIG. 5B, as part of operation 308 from method 300, after the MR condition generator module 124 matches the properties of the table 452 to conditions associated with the first digital tree 406A, the digital rock 406B, the second digital tree 406C, and the drop-target digital object 402A, the module 124 automatically (e.g., without any effort from the user) displays a corresponding first digital tree 456A, a digital rock 456B, and a second digital tree 456C on the table 452. In accordance with an embodiment, the drop-target digital object 402A is not shown in the target MR environment in FIG. 5B. The first digital tree 456A, digital rock 456B, and second digital tree 456C are displayed on the table 452 with the same relative size and position as when the first digital tree 406A, digital rock 406B and second digital tree 406C were placed on the drop-target digital object 402A as described with respect to FIG. 4C and operation 204 of the method 200.

Figure 6A:
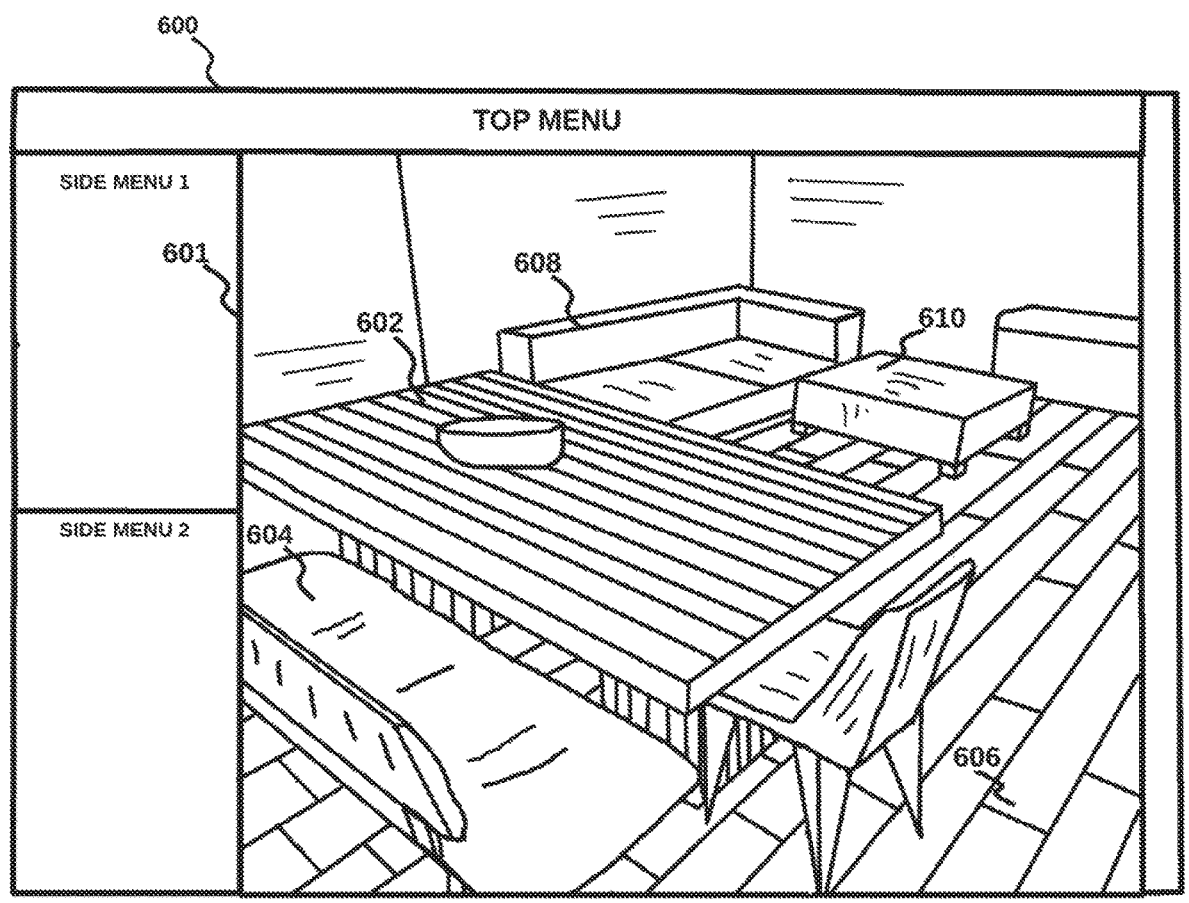
FIG. 6A is a screenshot illustrating a view of a mixed reality environment that includes furniture, in accordance with an embodiment.

In accordance with an embodiment, FIG. 6A is an illustration of a screenshot from a user interface 600 shown on a MR device display 120. The user interface 600 includes a display of an MR environment 601 (e.g., similar to FIG. 4A). The display of the MR environment 601 includes basic capture data from a physical world (e.g., or a simulation of the physical world) via a camera 114 or sensor 116. The MR environment 601 shown in FIG. 6A includes a table 602, a couch 608, a bench seat 604, a floor 606 and an ottoman 610.

Figure 6B:
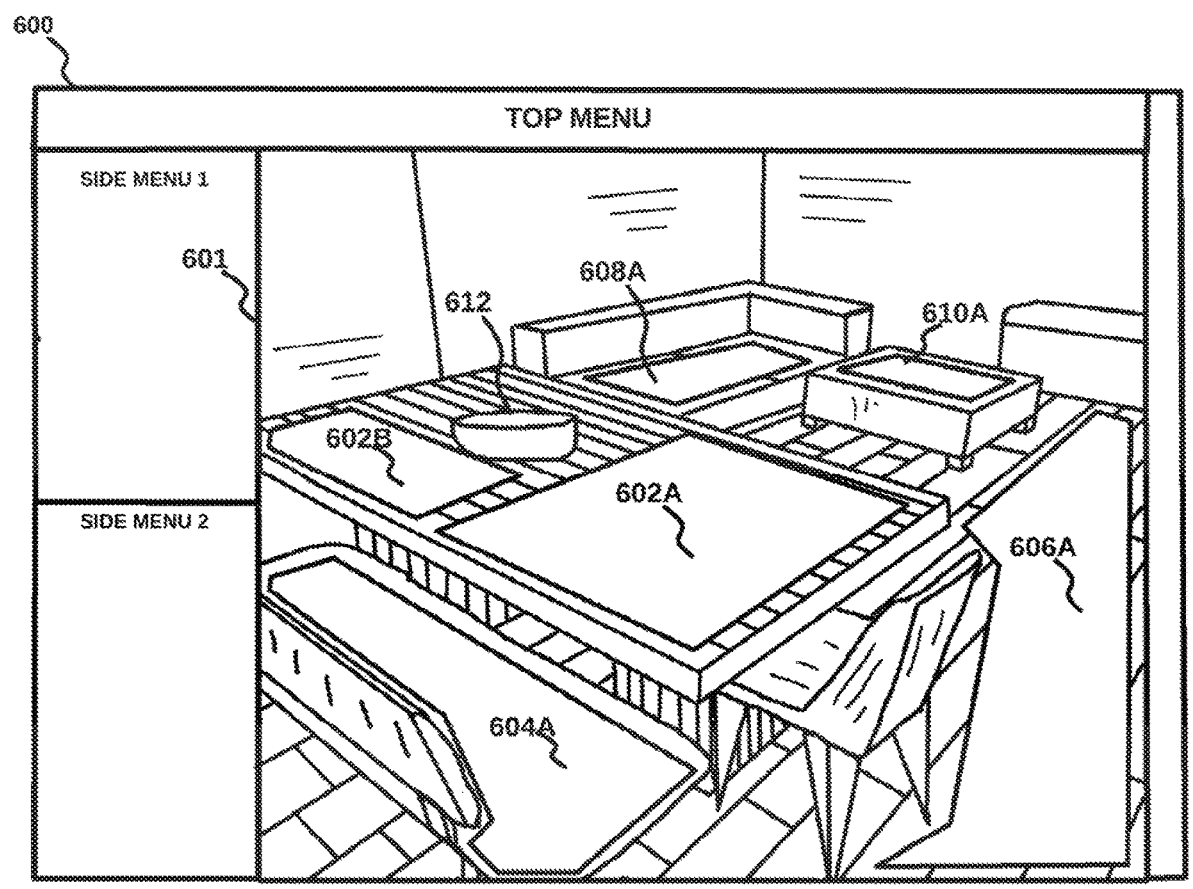
FIG. 6B is a screenshot illustrating a view of a mixed reality environment that includes furniture with drop-target digital objects, in accordance with an embodiment.

In accordance with an embodiment, FIG. 6B is an illustration of a screenshot from the user interface 600 shown in FIG. 6A during operation 203 of the method 200 as described with respect to FIG. 4B. The display of the MR environment 601 shows a plurality of detected objects and the drop-target digital objects (e.g., digital islands) overlaid on the detected objects. For example, the display of the MR environment 601 includes a first drop-target digital object 602A and a second drop-target digital object 602B for the table 602, a drop-target digital object 604A for the bench seat 604, a drop-target digital object 606A for the floor 606, a drop-target digital object 608A for the couch 608, and a drop-target digital object 610A for the ottoman 610. The displayed drop-target digital objects (602A, 602B, 604A, 606A, 608A and 610A) represent potential drop-targets (e.g., using a drag and drop method) where a user can add digital content as part of operation 204 of the method 200. In accordance with an embodiment, as part of operation 202 and operation 203 of the method 200, there may be a plurality of drop-target digital objects for one real-world object. In accordance with an embodiment, the number of drop-target digital objects for a single real-world object or surface is based on a number, size and position of one or more objects that appear to be on the real-world object or surface. For example, as shown in FIG. 6B, there is a first drop-target digital object 602A and a second drop-target digital object 602B for the one table 602 based on the presence of a bowl 612 on the table 602. The first drop-target digital object 602A and the second drop-target digital object 602B are positioned by the module 124 on the table 602 so as to avoid the bowl 612 (e.g., to avoid displaying digital content which will overlap with the bowl).

Figure 6C:
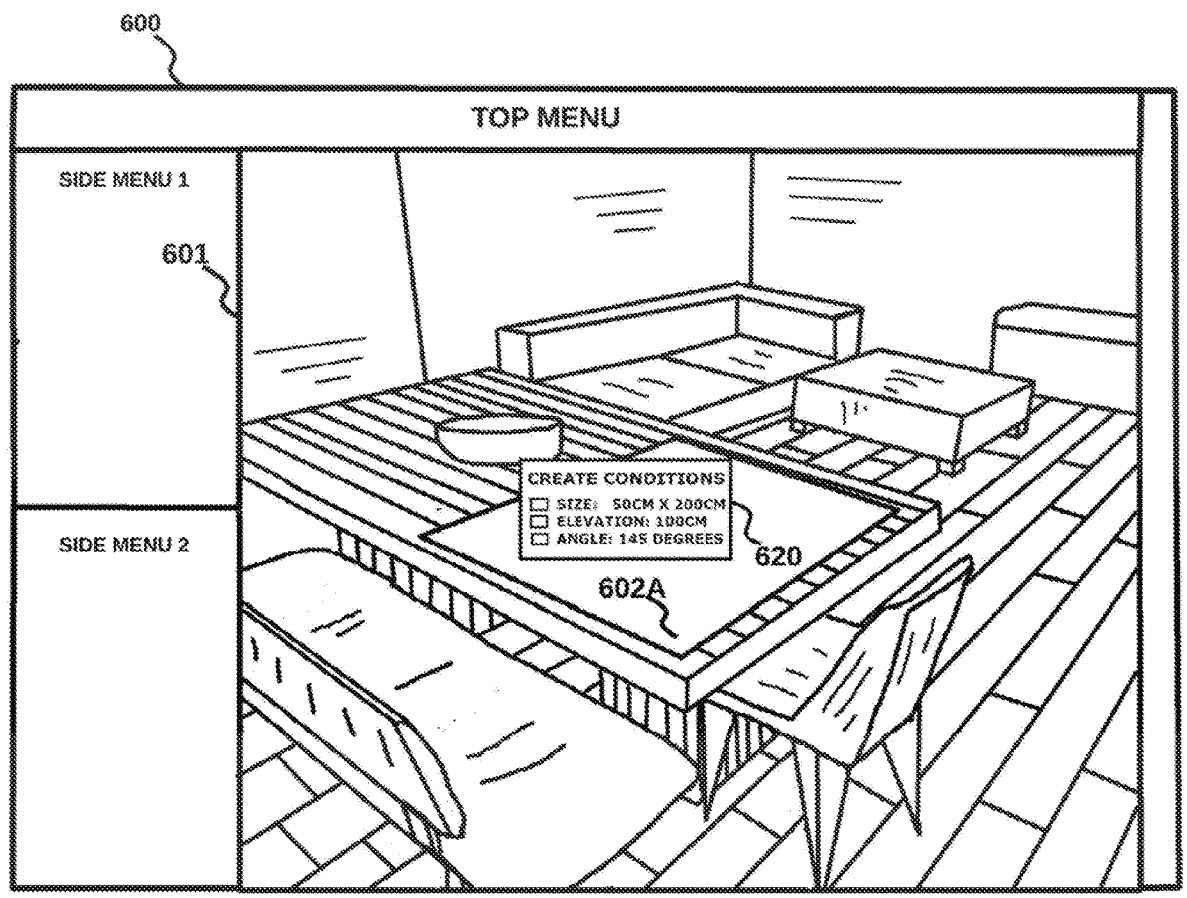
FIG. 6C is a screenshot illustrating a view of a mixed reality environment that includes furniture with a drop-target digital object and conditions for same, in accordance with an embodiment.

In accordance with an embodiment and as a part of operation 203 of the method 200, FIG. 6C is a continuation of FIG. 6B after a user has selected the digital object 602A representing the top of the table 602 and wherein the selection dismisses other drop-target digital objects (602B, 604A, 606A, 608A and 610A) and adds a digital text box object 620 which displays a set of conditions for the selected drop-target digital object 602A. In accordance with an embodiment, the conditions are determined by the MR condition generation module 124 as part of process 203 in the method 200. In accordance with an embodiment, the digital object 620 can be used to modify the conditions manually (e.g., using a keyboard or mouse to change a range of values, add conditions, remove conditions, and the like). The digital object 620 can include object tags with semantic data from detected objects.

Figure 6D:
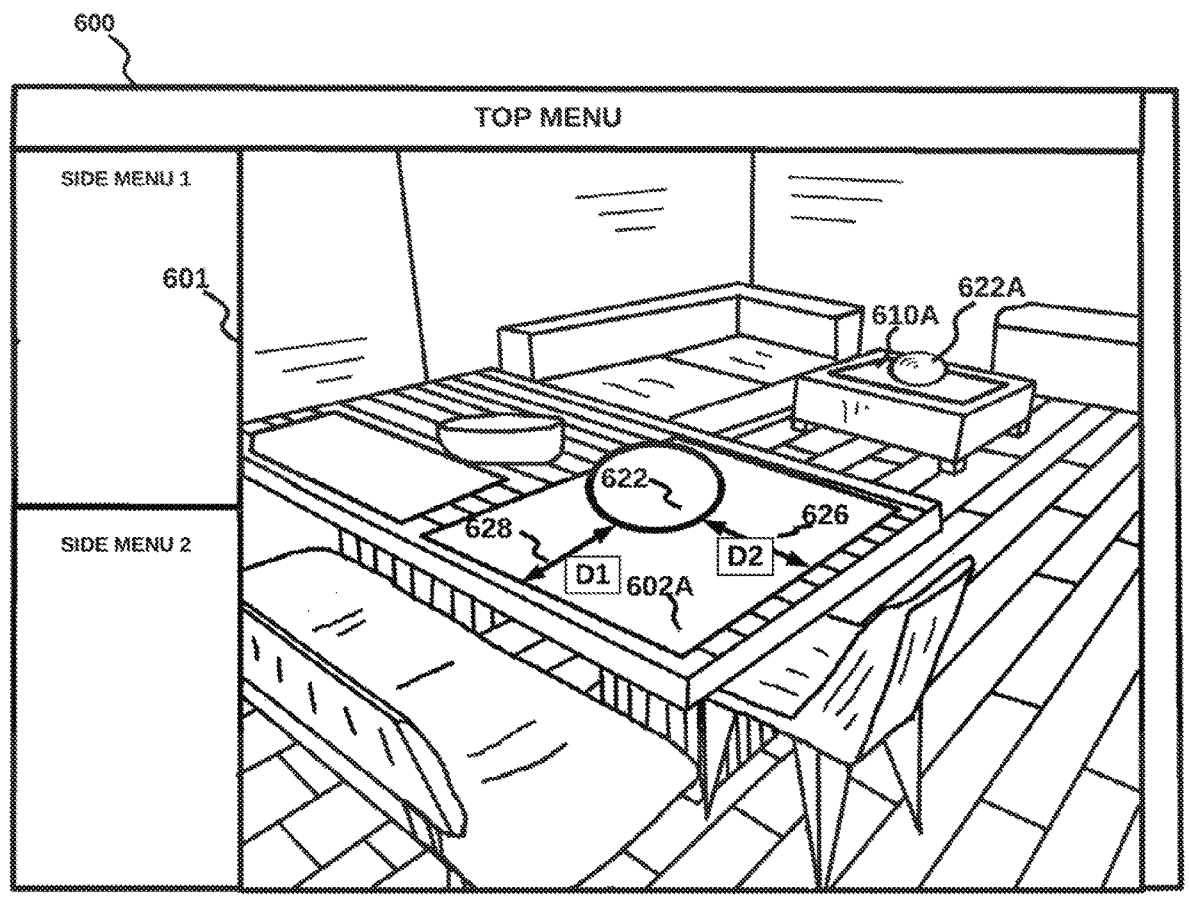
FIG. 6D is a screenshot illustrating a view of a mixed reality environment that includes furniture with two drop-target digital objects with a spherical digital object, in accordance with an embodiment.

In accordance with an embodiment, FIG. 6D is a continuation of FIG. 6C after a user has placed a spherical digital object 622 on the drop-target digital object 602A above the table 602 wherein the placement is part of operation 204 of the method 200. The placement of the spherical digital object 622 on the drop-target digital object 602A causes the MR condition generation module 124 to associate the conditions (e.g., as displayed in FIG. 6C) for the drop-target digital object 602A with the spherical digital object 622 (e.g., as part of process 210 from the method 200). After the conditions are associated with the spherical digital object 622, any additional detected object or surface in the MR environment 601 whose properties satisfy the same conditions (e.g., are within a specified range of the conditions) will spawn a similar spherical digital object. As an example, and shown in FIG. 6D, the drop-target digital object 610A above the ottoman 610 satisfies the same conditions (e.g., approximately the same size, shape and lighting conditions, but with a loose elevation criteria as determined in operation 306 of the method 300), and therefore has a second spherical digital object 622A placed thereon by the MR condition generator module 124 (e.g., as part of operation 308 of the method 300). Depending on how strict the conditions are set (e.g., a narrow range of values), a plurality of spherical digital objects could be spawned within the MR environment 601 based on a number and type of detected drop-target digital objects. As shown in FIG. 6D, the first spherical digital object 622 and the second spherical digital object 622A have spawned in the center of the respective drop-target digital objects 602A and 610A, however, the relative position of a digital object with respect to the drop-target digital object is not limited to the center of the drop-target digital object (e.g., as described with respect to process 208 in the method 200, the digital objects can be placed anywhere on the respective drop-target digital objects). The spherical digital object 622 may use any manner of connecting to the drop-target digital object 602A, including snapping to the surface and snapping to an edge, and the like.

While illustrated in the block diagrams as groups of discrete components communicating with each other via distinct data signal connections, it will be understood by those skilled in the art that various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching various embodiments.

It should be noted that the present disclosure can be carried out as a method, can be embodied in a system, a computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 7:
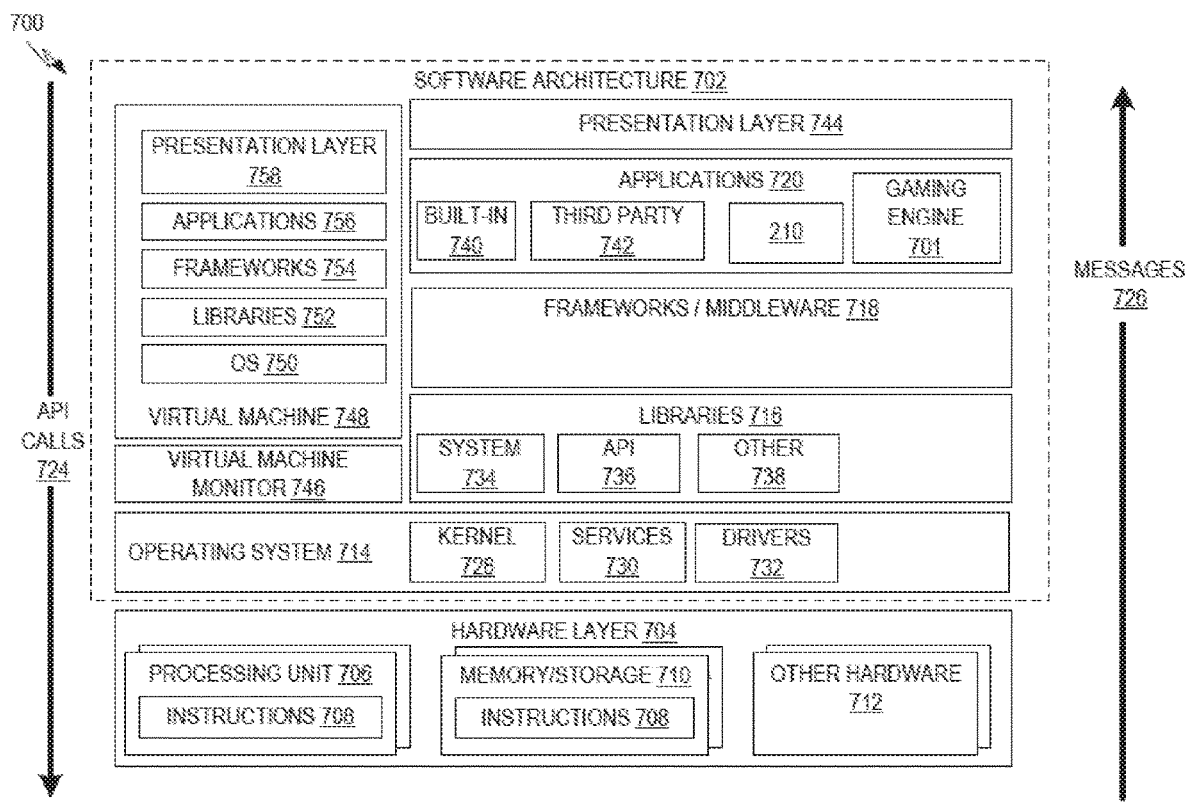
FIG. 7 is a block diagram illustrating an example software architecture, which may be used in conjunction with various hardware architectures described herein.

FIG. 7 is a block diagram 700 illustrating an example software architecture 702, which may be used in conjunction with various hardware architectures herein described to provide a gaming engine 701 and/or components of the MR Condition Generator system 100. FIG. 7 is a non-limiting example of a software architecture and it will be appreciated that many other architectures may be implemented to facilitate the functionality described herein. The software architecture 702 may execute on hardware such as a machine 800 of FIG. 8 that includes, among other things, processors 810, memory 830, and input/output (I/O) components 850. A representative hardware layer 704 is illustrated and can represent, for example, the machine 800 of FIG. 8. The representative hardware layer 704 includes a processing unit 706 having associated executable instructions 708. The executable instructions 708 represent the executable instructions of the software architecture 702, including implementation of the methods, modules and so forth described herein. The hardware layer 704 also includes memory/storage 710, which also includes the executable instructions 708. The hardware layer 704 may also comprise other hardware 712.

In the example architecture of FIG. 7, the software architecture 702 may be conceptualized as a stack of layers where each layer provides particular functionality. For example, the software architecture 702 may include layers such as an operating system 714, libraries 716, frameworks or middleware 718, applications 720 and a presentation layer 744. Operationally, the applications 720 and/or other components within the layers may invoke application programming interface (API) calls 724 through the software stack and receive a response as messages 726. The layers illustrated are representative in nature and not all software architectures have all layers. For example, some mobile or special purpose operating systems may not provide the frameworks/middleware 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 716 may provide a common infrastructure that may be used by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 816 may include system libraries 734 (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules.

The frameworks 718 (also sometimes referred to as middleware) provide a higher-level common infrastructure that may be used by the applications 720 and/or other software components/modules. For example, the frameworks/middleware 718 may provide various graphic user interface (GUI) functions, high-level resource management, high-level location services, and so forth. The frameworks/middleware 718 may provide a broad spectrum of other APIs that may be utilized by the applications 720 and/or other software components/modules, some of which may be specific to a particular operating system or platform.

The applications 720 include built-in applications 740 and/or third-party applications 742. Examples of representative built-in applications 740 may include, but are not limited to, a contacts application, a browser application, a book reader application, a location application, a media application, a messaging application, and/or a game application. Third-party applications 742 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 742 may invoke the API calls 724 provided by the mobile operating system such as operating system 714 to facilitate functionality described herein.

The applications 720 may use built-in operating system functions (e.g., kernel 728, services 730 and/or drivers 732), libraries 716, or frameworks/middleware 718 to create user interfaces to interact with users of the system. Alternatively, or additionally, in some systems, interactions with a user may occur through a presentation layer, such as the presentation layer 744. In these systems, the application/module "logic" can be separated from the aspects of the application/module that interact with a user.

Some software architectures use virtual machines. In the example of FIG. 7, this is illustrated by a virtual machine 748. The virtual machine 748 creates a software environment where applications/modules can execute as if they were executing on a hardware machine (such as the machine 800 of FIG. 8, for example). The virtual machine 748 is hosted by a host operating system (e.g., operating system 714) and typically, although not always, has a virtual machine monitor 746, which manages the operation of the virtual machine 748 as well as the interface with the host operating system (i.e., operating system 714). A software architecture executes within the virtual machine 748 such as an operating system (OS) 750, libraries 752, frameworks 754, applications 756, and/or a presentation layer 758. These layers of software architecture executing within the virtual machine 748 can be the same as corresponding layers previously described or may be different.

Figure 8:
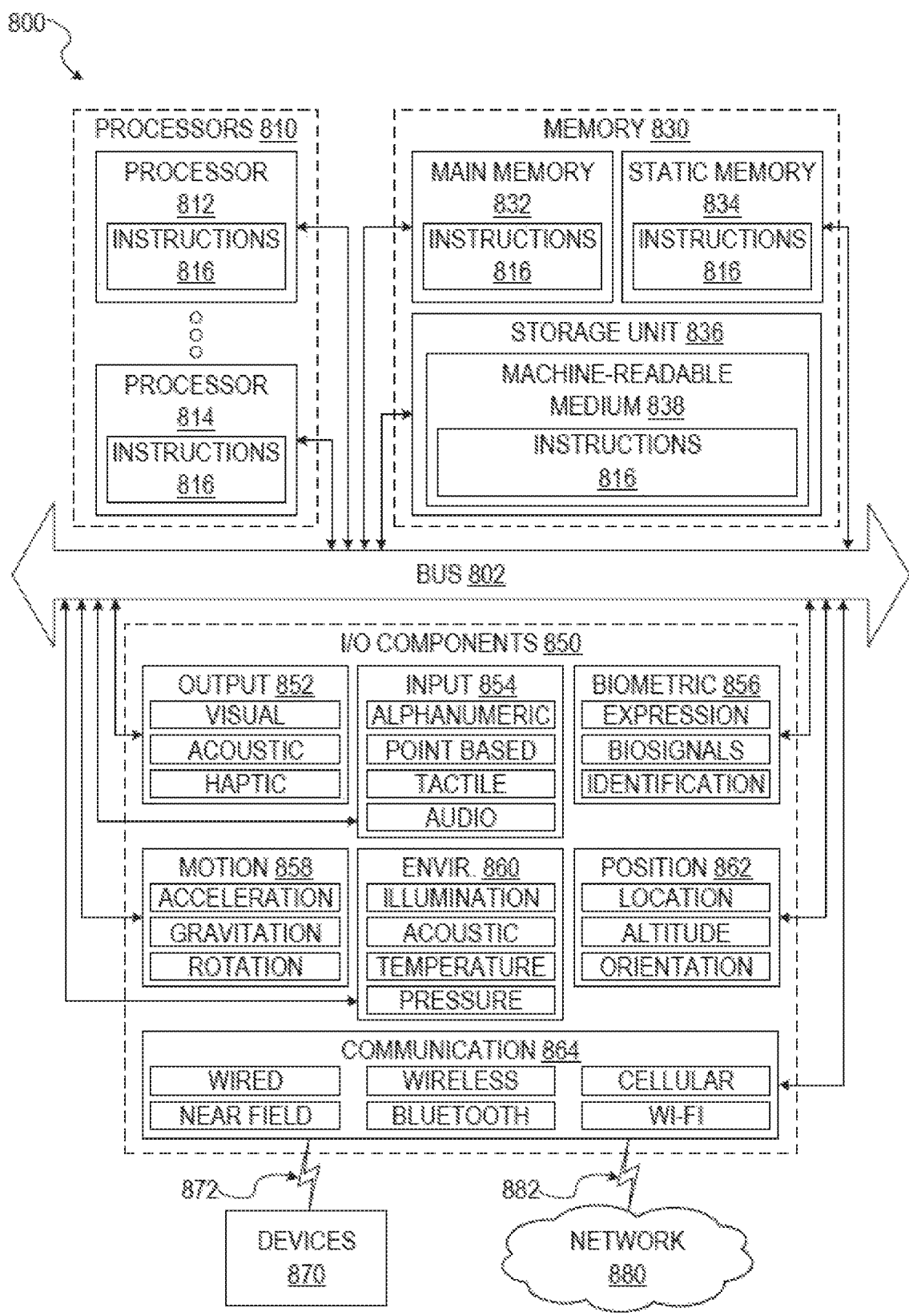
FIG. 8 is a block diagram illustrating components of a machine, according to some example embodiments, configured to read instructions from a machine-readable medium (e.g., a machine-readable storage medium) and perform any one or more of the methodologies discussed herein.

FIG. 8 is a block diagram illustrating components of a machine 800, according to some example embodiments, configured to read instructions from a machine-readable medium (e.g., a machine-readable storage medium) and perform any one or more of the methodologies discussed herein. In some embodiments, the machine 110 is similar to the HMD 102. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. As such, the instructions 816 may be used to implement modules or components described herein. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines that individually or jointly execute the instructions 816 to perform any one or more of the methodologies discussed herein.

The machine 800 may include processors 810, memory 830, and input/output (I/O) components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiples cores, or any combination thereof.

The memory/storage 830 may include a memory, such as a main memory 832, a static memory 834, or other memory, and a storage unit 836, both accessible to the processors 810 such as via the bus 802. The storage unit 836 and memory 832, 834 store the instructions 816 embodying any one or more of the methodologies or functions described herein. The instructions 816 may also reside, completely or partially, within the memory 832, 834, within the storage unit 836, within at least one of the processors 810 (e.g., within the processor's cache memory), or any suitable combination thereof, during execution thereof by the machine 800. Accordingly, the memory 832, 834, the storage unit 836, and the memory of processors 810 are examples of machine-readable media 838.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 850 may include a wide variety of components to receive input, provide output, produce output, transmit information, exchange information, capture measurements, and so on. The specific input/output (I/O) components 850 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 850 may include many other components that are not shown in FIG. 8. The input/output (I/O) components 850 are grouped according to functionality merely for simplifying the following discussion and the grouping is in no way limiting. In various example embodiments, the input/output (I/O) components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 862, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

What is claimed is:

1. A system comprising:
   one or more computer processors;
   one or more computer memories;
   one or more modules incorporated into the one or more computer memories, the one or more modules configuring the one or more computer processors to perform operations for generating conditions for spawning a digital object in an environment, the operations comprising:
   receiving data describing the environment, the data describing the environment including data describing properties of the environment, a state of the environment, and properties of a plurality of objects within the environment;
   analyzing the data describing the environment to detect one or more surfaces related to the plurality of objects;
   determining a first set of conditions, the first set of conditions being a range of values representing properties of one of the detected surfaces, the properties including one or more of a position, orientation, or scale of the one of the detected surfaces with respect to a local coordinate system-associated with the one of the detected surfaces;
   determining a second set of conditions, the second set of conditions describing a placement or orientation of the digital object with respect to the one of the detected surfaces;
   associating a final set of conditions with the digital object the final set of conditions being selected from the first set of conditions and the second set of conditions; and
   associating the final set of conditions with additional digital objects of a same type as the placed digital object.

2. The system of claim 1, wherein the data describing the environment is received from a mixed reality (MR) enabled device moving through the environment and collecting data.

3. The system of claim 2, wherein the data describing the environment is generated by sensors on the MR enabled device, the sensors including video cameras, motion sensors, and depth sensors.

4. The system of claim 1, wherein the data describing the environment is 3D environment data from a 3D digital model.

5. The system of claim 1, wherein data describing the placement is received from a MR capable device in the environment, and wherein the data describing the placement is generated by sensors on the MR capable device as the sensors monitor the placement of the digital object.

6. The system of claim 1, the operations including performing the spawning of the digital object in the environment based on the conditions, the performing including:
   analyzing the data describing the environment to determine one or more parts of the environment that match the final set of conditions selected from the first set of conditions and the second set of conditions;
   based on the matching of the final set of conditions with the one or more parts, positioning, scaling, and orienting a display of the digital object in a mixed reality display device contemporaneously with a view of the environment;

aligning the digital object with at least one part of the one or more parts based on the conditions and a movement of the mixed reality display device.

7. A method comprising:

performing operations for generating conditions for spawning a digital object in an environment, the operations comprising:

receiving data describing the environment, the data describing the environment including data describing properties of the environment, a state of the environment, and properties of a plurality of objects within the environment;

analyzing the data describing the environment to detect one or more surfaces related to the plurality of objects;

determining a first set of conditions, the first set of conditions being a range of values representing properties of one of the detected surfaces, the properties including one or more of a position, orientation, or scale of the one of the detected surfaces with respect to a local coordinate system-associated with the one of the detected surfaces;

determining a second set of conditions, the second set of conditions describing a placement or orientation of the digital object with respect to the one of the detected surfaces:

associating a final set of conditions with the digital object, the final set of conditions being selected from the first set of conditions and the second set of conditions; and associating the final set of conditions with additional digital objects of a same type as the placed digital object.

8. The method of claim 7, wherein the data describing the environment is received from a mixed reality (MR) enabled device moving through the environment and collecting data.

9. The method of claim 8, wherein the data describing the environment is generated by sensors on the MR enabled device, the sensors including video cameras; motion sensors, and depth sensors.

10. The method of claim 7, wherein the data describing the environment is 3D environment data from a 3D digital model.

11. The method of claim 7, wherein the data describing a placement is received from a MR capable device in the environment; and wherein the data is generated by sensors on the MR capable device as the sensors monitors a placement of a digital object within environment.

12. The method of claim 7, wherein data describing the placement is received from a MR capable device in the environment, and wherein the data describing the placement is generated by sensors on the MR capable device as the sensors monitor the placement of the digital object.

13. The method of claim 7, the operations including performing the spawning of the digital object in the environment based on the conditions, the performing including:

analyzing the data to determine one or more parts of the environment that match the conditions;

analyzing the data describing the environment to determine one or more parts of the environment that match the final set of conditions selected from the first set of conditions and the second set of conditions;

based on the matching of the final set of conditions with the one or more parts, positioning, scaling, and orienting a display of the digital object in a mixed reality display device contemporaneously with a view of the environment aligning the digital object with at least one part of the one or more parts based on the conditions and a movement of the mixed reality display device.

14. A non-transitory machine-readable storage medium storing a set of instructions, the set of instructions configuring one or more computer processors to perform operations for spawning a digital object in an environment, the operations comprising:

receiving data describing the environment, the data describing the environment including data describing properties of the environment, a state of the environment, and properties of a plurality of objects within the environment;

analyzing the data describing the environment to detect one or more surfaces related to the plurality of objects;

determining a first set of conditions, the first set of conditions being a range of values representing properties of one of the detected surfaces, the properties including one or more of a position, orientation, or scale of the one of the detected surfaces with respect to a local coordinate system-associated with the one of the detected surfaces;

determining a second set of conditions, the second set of conditions describing a placement or orientation of the digital object with respect to the one of the detected surfaces;

associating a final set of conditions with the digital object, the final set of conditions being selected from the first set of conditions and the second set of conditions; and associating the final set of conditions with additional digital objects of a same type as the placed digital object.

15. The non-transitory machine-readable storage medium of claim 14, wherein the data describing the environment is received from a mixed reality (MR) enabled device moving through the environment and collecting data.

16. The non-transitory machine-readable storage medium of claim 15, wherein the data describing the environment is generated by sensors on the MR enabled device, the sensors including video cameras, motion sensors, and depth sensors.

17. The non-transitory machine-readable storage medium of claim 14, wherein the data describing the environment is 3D environment data from a 3D digital model.

18. The non-transitory machine-readable storage medium of claim 14, wherein data describing the placement is received from a MR capable device in the environment, and wherein the data describing the placement is generated by sensors on the MR capable device as the sensors monitor the placement of the digital object.

19. The non-transitory machine-readable storage medium of claim 14, further comprising associating the final set of conditions with the placed digital object and associating the final set of conditions with additional digital objects of a same type as the placed digital object.

* * * * *